United States Patent
Huang

(10) Patent No.: US 12,497,032 B2
(45) Date of Patent: Dec. 16, 2025

(54) DRIVE SUPPORT APPARATUS, DRIVE SUPPORT METHOD, AND NON-TRANSITORY COMPUTER READABLE MEDIUM

(71) Applicant: NEC Corporation, Tokyo (JP)

(72) Inventor: Longshuang Huang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 339 days.

(21) Appl. No.: 18/121,449

(22) Filed: Mar. 14, 2023

(65) Prior Publication Data

US 2024/0101105 A1 Mar. 28, 2024

(30) Foreign Application Priority Data

Sep. 27, 2022 (JP) ................. 2022-154265

(51) Int. Cl.
| | |
|---|---|
| *B60W 30/09* | (2012.01) |
| *B60W 30/095* | (2012.01) |
| *B60W 50/14* | (2020.01) |
| *G06V 20/58* | (2022.01) |
| *G06V 40/10* | (2022.01) |

(52) U.S. Cl.
CPC ........ *B60W 30/09* (2013.01); *B60W 30/0953* (2013.01); *B60W 30/0956* (2013.01); *B60W 50/14* (2013.01); *G06V 20/58* (2022.01); *G06V 40/10* (2022.01); *B60W 2554/4029* (2020.02); *B60W 2554/80* (2020.02)

(58) Field of Classification Search
CPC ............. B60W 30/09; B60W 30/0953; B60W 30/0956; B60W 50/14; B60W 2554/4029; B60W 2554/80; G06V 20/58; G06V 40/10; G06V 40/20
See application file for complete search history.

(56) References Cited

U.S. PATENT DOCUMENTS

| | | | |
|---|---|---|---|
| 11,738,772 B1* | 8/2023 | Beller ................... | B60W 30/09 701/26 |
| 12,236,705 B1* | 2/2025 | Ulutan .................. | G06N 20/00 |
| 2015/0298621 A1* | 10/2015 | Katoh ..................... | G08G 1/16 348/148 |
| 2018/0190120 A1* | 7/2018 | Kim .................. | B60W 30/0953 |
| 2019/0061750 A1* | 2/2019 | Tamura ............. | B60W 30/0956 |
| 2019/0347492 A1* | 11/2019 | Morimura ........... | B60W 60/001 |
| 2020/0307563 A1* | 10/2020 | Ghafarianzadeh ..... | G06V 40/25 |
| 2022/0012988 A1* | 1/2022 | Avadhanam .......... | G08G 1/166 |
| 2022/0111871 A1* | 4/2022 | Schmitt ................. | B60Q 1/507 |
| 2024/0101105 A1* | 3/2024 | Huang ................... | G06V 20/58 |

FOREIGN PATENT DOCUMENTS

JP 2018-154313 A 10/2018

* cited by examiner

*Primary Examiner* — Daniel M. Robert

(57) ABSTRACT

A drive support apparatus capable of performing vehicle control at an appropriate timing in accordance with an attribute of a person existing in surroundings of a vehicle is provided. A drive support apparatus according to the present disclosure includes: a detection unit configured to detect a person in an image of surroundings of a vehicle; a calculation unit configured to calculate a positional relation between the vehicle and the person based on the image; an estimation unit configured to estimate an attribute of the person based on the image, the attribute being related to likelihood of an accident; and a determination unit configured to determine a timing of a vehicle control based on the positional relation and the attribute.

10 Claims, 9 Drawing Sheets

EXAMPLES OF ATTRIBUTE

| PERSON TYPE | CHARACTERISTIC | DANGEROUS SCENE |
|---|---|---|
| CHILD | • HAS A HEIGHT LOWER THAN ANY NEARBY PERSON<br>• CARRIES A BOOKBAG ON THE BACK<br>• CHILD RECOGNITION BY FACE RECOGNITION<br>  (SUCH AS AGE ESTIMATION BY FACE RECOGNITION) | • PLAYING WITH A BALL<br>• RIDING ON A SKATEBOARD OR A BICYCLE<br>• HAVING A PARENT NEARBY BUT NOT HOLDING HANDS WITH THE PARENT<br>• A PLURALITY OF CHILDREN ARE FOOLING AROUND |
| AGED PERSON | • THE BACK IS BENT<br>• HAS WHITE HAIR<br>• WALKING SPEED IS SLOW<br>• AGED-PERSON RECOGNITION BY FACE RECOGNITION<br>  (SUCH AS AGE ESTIMATION BY FACE RECOGNITION) | • CROSSING A ROAD WITHOUT A CROSSWALK<br>• TRAFFIC LIGHT IS CHANGING TO RED |
| PERSON WITH WALKING DIFFICULTY | • USING A WALKING AID (WALKING STICK, WALKER, OR WALKING VEHICLE)<br>• SITTING ON A WHEELCHAIR | • THERE IS A STEP NEARBY |
| GENERAL PEDESTRIAN | OTHER THAN CHARACTERISTICS LISTED ABOVE | • OPERATING A SMARTPHONE OR MAKING A CALL WHILE WALKING<br>• A PLURALITY OF PEDESTRIANS ARE WALKING WHILE HAVING A CONVERSATION<br>• THERE IS A CROSSWALK NEARBY |

Fig. 5

IMAGE OF TIMING TABLE 191

| | | RELATIVE SPEED V | | | | |
|---|---|---|---|---|---|---|
| | | 0 | 10km/h | 20km/h | 30km/h | ... |
| OVERLAPPING RATE L | 0 | – | 3m | 6m | 8m | ... |
| | 0.1 | – | 5m | 8m | 10m | ... |
| | 0.2 | – | 8m | 10m | 12m | ... |
| | 0.3 | – | 10m | 12m | 15m | ... |
| | ⋮ | ⋮ | ⋮ | ⋮ | ⋮ | ... |

RELATIVE DISTANCE THRESHOLD Th

Fig. 6

CORRESPONDENCE BETWEEN ATTRIBUTE AND TIMING TABLE

| PERSON TYPE | VEHICLE CONTROL | |
|---|---|---|
| | BRAKING INTERVENTION | WARNING TO DRIVER |
| CHILD | 191-1 | 191-6 |
| AGED PERSON | 191-2 | 191-7 |
| PERSON WITH WALKING DIFFICULTY | 191-3 | 191-8 |
| GENERAL PEDESTRIAN (WITH DANGEROUS SCENE) | 191-4 | 191-9 |
| GENERAL PEDESTRIAN (WITHOUT DANGEROUS SCENE) | 191-5 | 191-10 |

Fig. 7

DRIVE SUPPORT APPARATUS, DRIVE SUPPORT METHOD, AND NON-TRANSITORY COMPUTER READABLE MEDIUM

INCORPORATION BY REFERENCE

This application is based upon and claims the benefit of priority from Japanese patent application No. 2022-154265, filed on Sep. 27, 2022, the disclosure of which is incorporated herein in its entirety by reference.

TECHNICAL FIELD

The present disclosure relates to a drive support apparatus, a drive support method, and a computer program.

BACKGROUND ART

Technologies for sensing a pedestrian existing in the surroundings of a vehicle and avoiding an accident that would occur between the vehicle and the pedestrian have been known. For example, technologies of an automatic braking system configured to automatically actuate a brake to avoid collision when having sensed a pedestrian in a certain distance from a vehicle have been known.

Japanese Unexamined Patent Application Publication No. 2018-154313 discloses a related technology of a drive support apparatus configured to perform, when a vehicle potentially collides with an object sensed in the surroundings of the vehicle, collision avoiding control for avoiding collision between the object and the vehicle. When performing the collision avoiding control while illumination light is set to high beam, the drive support apparatus prevents switching of the illumination light from high beam to low beam.

SUMMARY

Consider a case in which an automatic braking system of a vehicle determines whether to perform automatic braking for a pedestrian in the surroundings. In such a case, an image of the surroundings is captured by, for example, a camera mounted on the vehicle and a pedestrian is recognized in the captured image. Then, the relative distance between the vehicle and the pedestrian is estimated based on the captured image, and it is determined to perform automatic braking when the relative distance is shorter than a predetermined distance. The same processing can be performed by using, in place of the camera, a sensor such as a radar capable of measuring the distance to a target object.

However, an attribute (for example, age or height) varies among pedestrians and an appropriate braking timing differs among them in some cases. For example, the height of a child is lower than that of an adult, and thus a driver has difficulty in recognizing the existence thereof in some cases. Furthermore, a child cannot sufficiently predict danger and thus sometimes takes an action such as abrupt jump-in from a sidewalk. Thus, a child is more likely to be involved in an accident than an adult.

Thus, in a case in which a pedestrian is a child, braking needs to be actuated at a timing earlier than in a case in which the pedestrian is an adult even when the distance between the pedestrian and the vehicle is the same between the cases. For example, when the driver is warned, as well, in a case in which the pedestrian is a child, the warning needs to be performed at an early timing as possible than a case in which the pedestrian is an adult.

The above-described problem is not limited to a child. The same problem applies to, for example, an aged person, a wheelchair user, and a pedestrian having a conversation and not sufficiently paying attention to vehicles. The technology disclosed in Japanese Unexamined Patent Application Publication No. 2018-154313 does not consider such collision avoiding control in accordance with attributes of a pedestrian.

An example object of the disclosure in view of the above-described problem is to provide a drive support apparatus, a drive support method, and a computer program that are capable of performing vehicle control at an appropriate timing in accordance with an attribute of a person existing in surroundings of a vehicle.

A drive support apparatus according to a first aspect of the present disclosure includes:
  a detection unit configured to detect a person in an image of surroundings of a vehicle;
  a calculation unit configured to calculate a positional relation between the vehicle and the person based on the image;
  an estimation unit configured to estimate an attribute of the person, the attribute being related to likelihood of an accident based on the image; and
  a determination unit configured to determine a timing of a vehicle control based on the positional relation and the attribute.

A drive support method according to a second aspect of the present disclosure is a method by which a computer executes:
  a detection step of detecting a person in an image of surroundings of a vehicle;
  a calculation step of calculating a positional relation between the vehicle and the person based on the image;
  an estimation step of estimating an attribute of the person, the attribute being related to likelihood of an accident based on the image; and
  a determination step of determining a timing of a vehicle control based on the positional relation and the attribute.

A computer program according to a third aspect of the present disclosure causes a computer to execute:
  a detection step of detecting a person in an image of surroundings of a vehicle;
  a calculation step of calculating a positional relation between the vehicle and the person based on the image;
  an estimation step of estimating an attribute of the person, the attribute being related to likelihood of an accident based on the image; and
  a determination step of determining a timing of a vehicle control based on the positional relation and the attribute.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 5 is a diagram illustrating examples of an attribute according to the second example embodiment;

FIG. 6 is a diagram illustrating an image of a timing table as an example of timing information according to the second example embodiment;

FIG. 7 is a diagram illustrating an example of the correspondence relation between an attribute and a timing table according to the second example embodiment;

EMBODIMENTS

Figure 1:
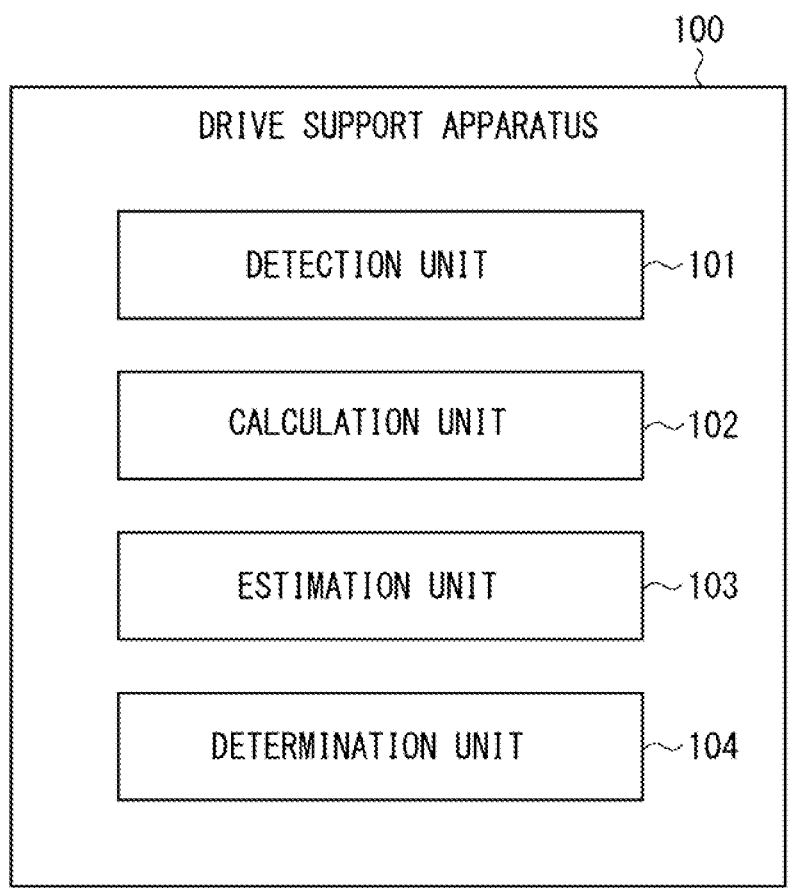
FIG. 1 is a block diagram illustrating the configuration of a drive support apparatus according to a first example embodiment.

Example embodiments of the present disclosure will be described below in detail with reference to the accompanying drawings. In the drawings, identical or corresponding elements are denoted by the same reference sign. Duplicate description is omitted as necessary for clarification of description.

First Example Embodiment

First, a first example embodiment will be described below with reference to FIG. 1. FIG. 1 is a block diagram illustrating the configuration of a drive support apparatus 100 according to the present example embodiment. The drive support apparatus 100 includes a detection unit 101, a calculation unit 102, an estimation unit 103, and a determination unit 104.

The detection unit 101 detects a person in an image obtained by image capturing of the surroundings of a vehicle. The calculation unit 102 calculates the positional relation between the vehicle and the person based on the image. The estimation unit 103 estimates an attribute of the person based on the captured image, the attribute being related to the likelihood of an accident. The determination unit 104 determines the timing of certain vehicle control based on the positional relation and the attribute.

The drive support apparatus 100 includes a processor, a memory, and a storage apparatus, which are not illustrated. The storage apparatus stores a computer program that implements processing according to the present example embodiment. The processor can load the computer program from the storage apparatus onto the memory and execute the computer program. Accordingly, the processor realizes functions of the detection unit 101, the calculation unit 102, the estimation unit 103, and the determination unit 104.

Alternatively, the detection unit 101, the calculation unit 102, the estimation unit 103, and the determination unit 104 may be each realized by a dedicated hardware component. Part or the entire of each constituent component of each apparatus may be realized by, for example, a general-purpose or dedicated circuitry, a processor, or a combination thereof. Each constituent component may be configured as a single chip or may be configured as a plurality of chips connected to one another through a bus. Part or the entire of each constituent component of each apparatus may be realized by combination of the above-described circuitry or the like with a computer program. A processor may be a central processing unit (CPU), a graphics processing unit (GPU), a field-programmable gate array (FPGA), a quantum processor (quantum computer control chip), or the like.

When part or the entire of each constituent component of the drive support apparatus 100 is realized by a plurality of information processing apparatuses, circuitries, or the like, the plurality of information processing apparatuses, circuitries, or the like may be centralized or distributed. For example, the information processing apparatuses, circuitries, or the like may be connected to one another as, for example, a client server system or a cloud computing system through a communication network. Functions of the drive support apparatus 100 may be provided in the format of software as a service (SaaS).

Figure 2:
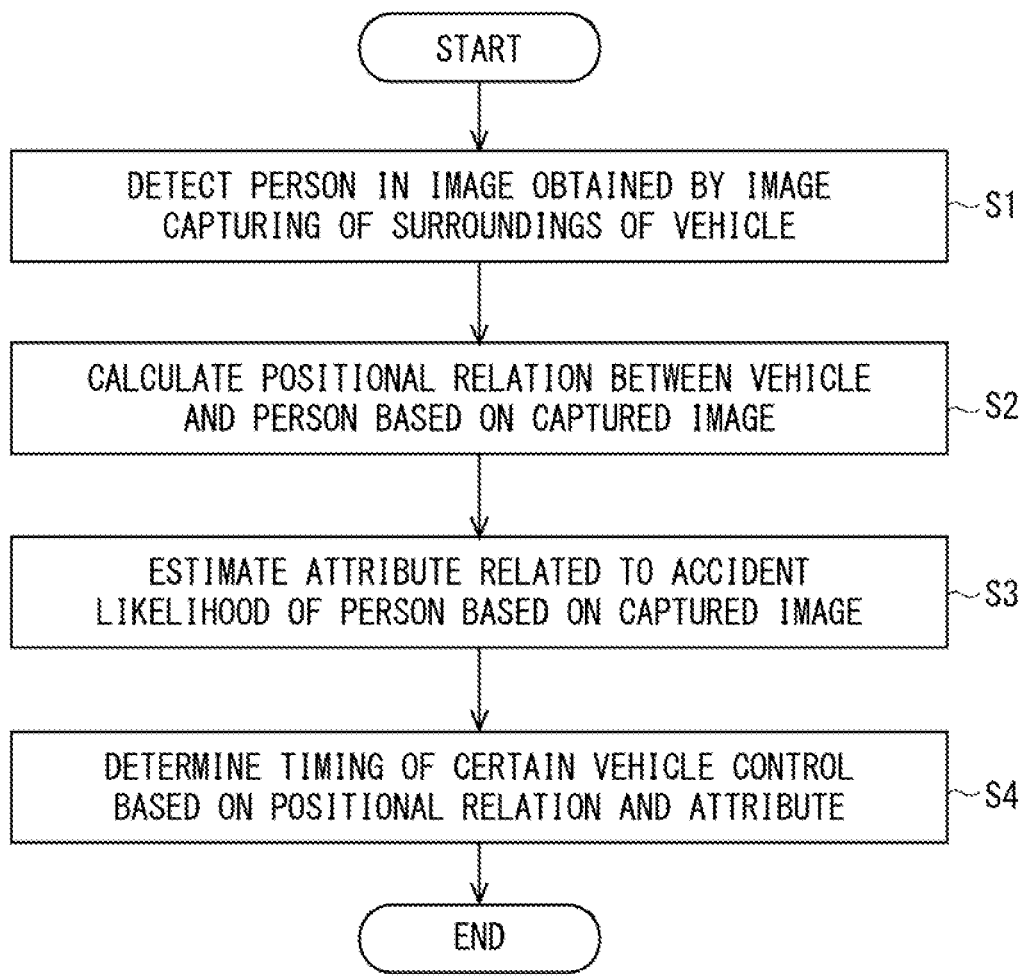
FIG. 2 is a flowchart illustrating processing performed by the drive support apparatus according to the first example embodiment.

Processing performed by the drive support apparatus 100 will be described below with reference to FIG. 2. FIG. 2 is a flowchart illustrating the processing performed by the drive support apparatus 100.

The detection unit 101 detects a person in an image obtained by image capturing of the surroundings of the vehicle (S1). The calculation unit 102 calculates the positional relation between the vehicle and the person based on the captured image (S2). The estimation unit 103 estimates an attribute of the person based on the captured image, the attribute being related to the likelihood of an accident (S3). The determination unit 104 determines the timing of certain vehicle control based on the positional relation and the attribute (S4).

The drive support apparatus 100 performs the certain vehicle control in accordance with the determined timing. In this manner, the drive support apparatus 100 according to the present example embodiment can perform vehicle control at an appropriate timing in accordance with the attribute of a person existing in the surroundings of the vehicle.

Second Example Embodiment

Figure 3:
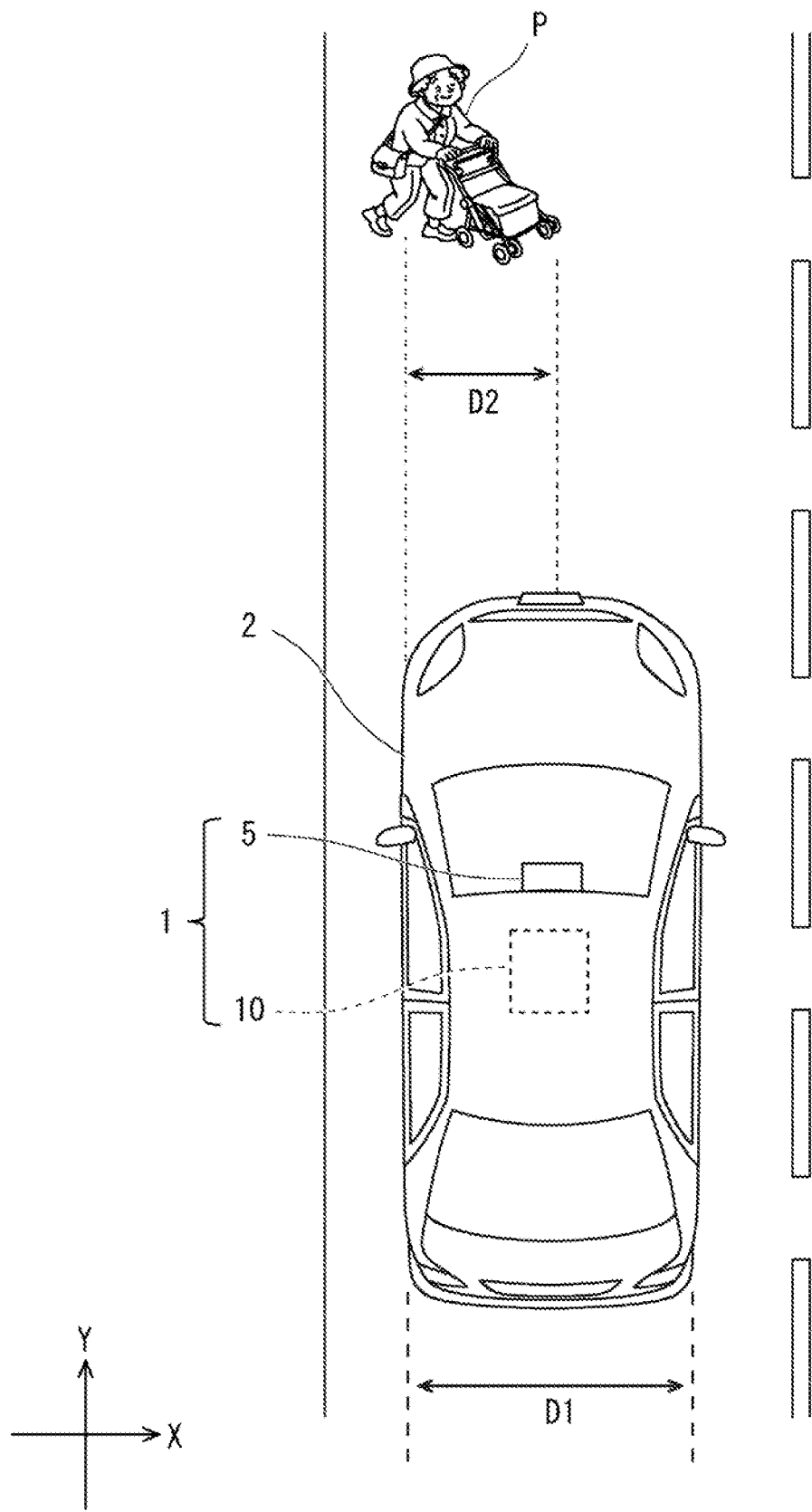
FIG. 3 is a diagram illustrating the configuration of a drive support system according to an second example embodiment.

A second example embodiment will be described next. The second example embodiment is a specific example of the above-described first example embodiment. First, a drive support system 1 according to the present example embodiment will be described below with reference to FIG. 3. FIG. 3 is a diagram illustrating the configuration of the drive support system 1.

The drive support system 1 includes a camera 5 and a drive support apparatus 10 that are mounted on a vehicle 2. The drive support system 1 is an information processing apparatus system in which an image captured by the camera 5 is acquired by the drive support apparatus 10 and provided with certain processing at the drive support apparatus 10 to achieve drive support. In FIG. 3, an X axis represents the width direction of the vehicle 2, and a Y axis represents the length direction of the vehicle 2. In this example, the positive Y-axis direction is the traveling direction of the vehicle 2.

The camera 5 is an image capturing apparatus configured to perform image capturing in a predetermined direction with respect to the vehicle 2 and acquire a captured image. In the example illustrated in FIG. 3, the camera 5 captures an image of a range including a pedestrian P positioned on the front side of the vehicle 2. The camera 5 may be provided, for example, at an upper part on the front side of the driver seat, an upper part on the front side of the passenger seat, or any other position. In FIG. 3, the camera 5 is provided at an upper part on the front side of the driver seat.

The camera 5 captures an image of the surroundings of the vehicle 2. The camera 5 may capture an image of both the outside and inside of the vehicle 2. The camera 5 may be a camera configured to capture an image in a fixed certain direction or may be an all-surrounding camera. FIG. 3 illustrates the example in which one camera 5 is provided, but a plurality of cameras 5 may be provided. For example, the cameras 5 may be provided at an upper part on the front side of the driver seat and an upper part on the back side of the driver seat and perform image capturing toward the front and back sides of the vehicle 2. The positions, number, and image capturing ranges of the cameras 5 are not limited thereto.

A captured image acquired by each camera 5 may be a still image or a moving image. In the present disclosure, an "image" also means image data that is data of the image. Specifically, the captured image acquired by the camera 5 also means "image data of the captured image". For example, a detection unit 11 in the drive support apparatus 10 acquires image data of a captured image.

The camera 5 outputs the acquired captured image to the drive support apparatus 10. In description of the present example embodiment, the camera 5 is a camera capable of acquiring a two-dimensional image. The present disclosure is not limited thereto, and a distance measurement sensor capable of three-dimensionally scanning a surrounding space may be used in place of or together with the camera 5.

The distance measurement sensor is a sensor configured to measure the distance to an object existing in the surroundings of the vehicle 2. The distance measurement sensor may be, for example, a LIDAR (light detection and ranging or laser imaging detection and ranging) apparatus. In this case, the distance measurement sensor transmits a laser beam to the surroundings of the vehicle 2 and receives the laser beam reflected by a person or an object, thereby detecting the person or the object in the surroundings. The distance measurement sensor scans all directions with LIDAR and acquires three-dimensional point-group data of an object in the surroundings of the vehicle. The distance measurement sensor outputs the three-dimensional point-group data to the drive support apparatus 10.

Instead of the LIDAR apparatus, various sensors capable of measuring the distance to a target object, such as a stereo camera, a time-of-flight (ToF) camera, and a millimeter wave radar may be used as the distance measurement sensor. The distance measurement sensor may also have functions of the above-described camera 5. It is possible to improve the accuracy of person recognition by using both the camera 5 and the distance measurement sensor.

Figure 4:
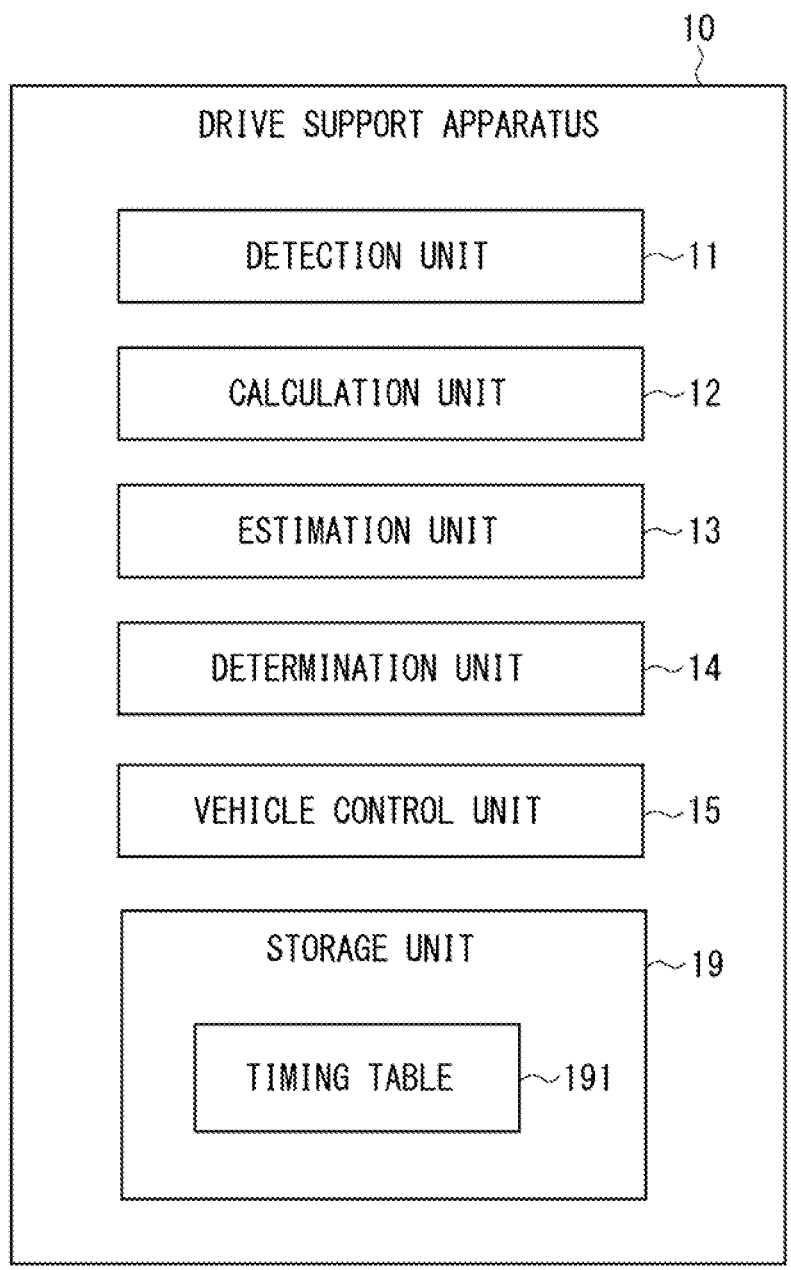
FIG. 4 is a block diagram illustrating the configuration of a drive support apparatus according to the second example embodiment.

The configuration of the drive support apparatus 10 will be described next with reference to FIG. 4. FIG. 4 is a block diagram illustrating the configuration of the drive support apparatus 10. The description is performed with reference to FIG. 3 as appropriate.

The drive support apparatus 10 is an example of the above-described drive support apparatus 100. The drive support apparatus 10 is an information processing apparatus capable of executing a drive support method according to the present example embodiment. The drive support apparatus 10 may be, for example, a personal computer (PC) or a tablet terminal.

The drive support apparatus 10 includes the detection unit 11, a calculation unit 12, an estimation unit 13, a determination unit 14, a vehicle control unit 15, and a storage unit 19.

The detection unit 11 is an example of the above-described detection unit 101. The detection unit 11 detects a person in an image obtained by image capturing of the surroundings of the vehicle 2. The detection unit 11 may detect the person in the captured image by using a well-known image recognition technology or the like.

The person is a human existing in the surroundings of the vehicle 2. The person is, for example, a pedestrian. The present disclosure is not limited thereto, and the person may include a human riding a bicycle or a motorbike. The person may also include a human using a movement aid. The movement aid is, for example, a wheelchair, a walker, or a walking vehicle. The walking vehicle is, for example, an aged-person walker illustrated in FIG. 3.

The detection unit 11 may detect an object associated with the person. The object may be, for example, an object that the person wears, has, or uses. Examples of the object include a bookbag, a smartphone, a cellular phone terminal, a tablet terminal, a skateboard, a ball, and the above-described movement aid.

The detection unit 11 may detect motion of the person based on the captured image. The motion of the person may include, for example, movement in which the person is having a conversation with a plurality of persons, crossing a road, or operating a smartphone or the like while walking. The detection unit 11 also detects the moving speed of the person based on a plurality of images captured at different timings. The detection unit 11 may detect the moving direction of the person based on a plurality of images.

The detection unit 11 may detect a plurality of persons in the captured image. The plurality of persons are, for example, a parent and a child, children walking to and from school, or friends walking together while having a conversation. The detection unit 11 may detect a plurality of persons moving together at a certain distance by calculating the distance between the persons in the image. Accordingly, the detection unit 11 detects a plurality of persons positioned near one another.

The calculation unit 12 is an example of the above-described calculation unit 102. The calculation unit 12 calculates (estimates) the positional relation between the vehicle 2 and a person based on the captured image. The calculation unit 12 may calculate the positional relation by using a well-known image recognition technology.

The positional relation is information indicating the relation between the position of the vehicle 2 and the position of the person. The positional relation may include information of the distance between the vehicle 2 and the person. The positional relation may also include information of a direction in which the person is positioned with respect to the vehicle 2. The positional relation may also include overlap information indicating the degree of overlapping between the traveling path of the vehicle 2 and the person.

The calculation unit 12 may calculate each of the distance between the vehicle 2 and the person, the direction in which the person is positioned, and the overlap information by analyzing the captured image. The calculation unit 12 may calculate some or all of them as the positional relation.

The calculation unit 12 calculates the distance between the vehicle 2 and the person based on, for example, image size of the person in the captured image. The calculation unit 12 calculates the distance between the vehicle 2 and the person by, for example, referring to data by which the image size of the person in the captured image is associated with the distance to the person. The present disclosure is not limited thereto, and the calculation unit 12 may calculate the distance by using another method.

The calculation unit 12 calculates the direction in which the person is positioned by, for example, calculating the angle difference between the traveling direction of the vehicle 2 and the direction in which the person exists. The calculation unit 12 calculates, for example, the difference between a coordinate representing the position of the person in the captured image and the center coordinate of the captured image. The calculation unit 12 calculates the direction of the person with respect to the vehicle 2 by referring to data in which the difference and the angle difference are associated with each other. The present disclosure is not limited thereto, and the calculation unit 12 may calculate the direction in which the person is positioned by using another method.

The calculation unit 12 calculates the overlap information indicating the degree of overlapping between the traveling path of the vehicle 2 and the person based on the captured image. In description of the present example embodiment, an overlapping rate L is used as an example of the overlap information.

In the example illustrated in FIG. 3, D1 represents the width of the vehicle 2, and D2 represents a length by which the vehicle 2 and the pedestrian P overlap in the width direction. In this case, the overlapping rate L can be expressed as Calculation Expression (1) below.

$$L = D2/D1 \tag{1}$$

When the distance between the vehicle 2 and the pedestrian P is constant, the probability of collision between the vehicle 2 and the pedestrian P increases as the overlapping rate L increases. Thus, the determination unit 14 to be described later needs to perform vehicle control such as braking at an early timing as possible.

Description continues with reference to FIG. 4 again. The calculation unit 12 calculates a relative distance between the vehicle 2 and the person based on the captured image. In addition, the calculation unit 12 calculates a relative speed between the vehicle 2 and the person based on the captured image. When a plurality of persons are included in the captured image, the calculation unit 12 calculates the positional relation between the vehicle 2 and each of the plurality of persons.

The example in which the positional relation is calculated based on the captured image acquired by the camera 5 is described above, but the present disclosure is not limited thereto. The calculation unit 12 may calculate the positional relation based on distance information acquired by the distance measurement sensor. Alternatively, the calculation unit 12 may calculate the positional relation by using both the camera 5 and the distance measurement sensor. Accordingly, the positional relation between the vehicle 2 and the person can be accurately calculated.

The estimation unit 13 is an example of the above-described estimation unit 103. The estimation unit 13 estimates an attribute of the person based on the captured image, the attribute being related to the likelihood of an accident. The "accident" may include not only contact between the vehicle 2 and the person but also a scene (such as a near miss) that contact is highly likely to occur.

The attribute may include a characteristic of the person, the characteristic including, for example, at least any one of appearance of the person, motion of the person, an object associated with the person, and an environment surrounding the person. The attribute may be information estimated based on such a characteristic. The estimation unit 13 may estimate such an attribute by using a well-known image recognition technology or the like.

The appearance of the person is, for example, the height, hair color, face characteristic, or posture of the person. The attribute may be, for example, the age or sex of the person, which is estimated based on these pieces of information. The motion of the person is, for example, movement in which the person operates a smartphone or the like or walking speed of the person. The object associated with the person is, for example, a movement aid. The environment surrounding the person is, for example, the existence of a crosswalk.

The estimation unit 13 may extract an object, motion, and the like associated with each of a plurality of persons detected by the detection unit 11. When a plurality of persons positioned near one another are detected in the image, the estimation unit 13 may estimate the attribute of at least one of the plurality of persons. For example, the estimation unit 13 may detect a state in which, for example, the plurality of persons are having a conversation or fooling around.

These are exemplary and the contents of the attribute are not limited thereto. The attribute may include various kinds of characteristics for specifying the likelihood of an accident. The attribute may include information related to the unlikelihood of an accident.

The attribute will be specifically described below with reference to FIG. 5. FIG. 5 is a diagram illustrating examples of the attribute. As illustrated in FIG. 5, the attribute may include, for example, information of a person type, a characteristic, and a dangerous scene.

The person type is information indicating the type of the person detected in the image. As illustrated in the drawing, the person type is, for example, information identifying whether the person is any of a child, an aged person, a person with walking difficulty, and a general pedestrian. They are exemplary, and thus the person type may include information identifying any other information. One person may correspond to a plurality of examples of the person type. For example, the person may be an aged person and a person with walking difficulty.

The characteristic is a characteristic of the person, which is estimated based on the captured image. The characteristic may be characteristic information indicated by, for example, appearance of the person, motion of the person, an object associated with the person, and an environment surrounding the person. Alternatively, information estimated based on these characteristics may be used as the characteristic.

The dangerous scene is a situation in which it is assumed that an accident is likely to occur. The dangerous scene is, for example, a situation in which it is assumed that the person is focused on a ball, a smartphone, or the like and attention on the vehicle 2 is insufficient.

The estimation unit 13 may estimate the above-described various examples of the attribute by using a well-known image recognition technology or the like. Examples of the attribute estimated by the estimation unit 13 will be specifically described below with reference to the examples illustrated in FIG. 5.

For example, the estimation unit 13 estimates the person type of the person based on the height of the person. The estimation unit 13 determines whether the height of the person is equal to or higher than a predetermined threshold, and estimates the person type in accordance with a result of the determination. The threshold may be fixed or may be changed as appropriate. The estimation unit 13 estimates that the person is a child when the height is lower than the threshold, or estimates that the person is not a child otherwise. Alternatively, when a person having a relatively low height among a plurality of persons is detected, the estimation unit 13 may estimate that the person is a child.

The estimation unit 13 may estimate the person type by performing face recognition. The estimation unit 13 detects a face region of the person in the captured image and estimates an age by using a face image. The estimation unit 13 may estimate the age of the person by using, for example, a well-known face recognition algorithm using an artificial intelligence (AI) technology. The estimation unit 13 estimates whether the person is a child, an aged person, or a person of another age based on the estimated age.

The estimation unit 13 may estimate the person type based on the posture of the person. For example, the estimation unit 13 determines whether the back of the person is bent, and estimates that the person is an aged person when the back is bent. The estimation unit 13 may specify the hair color of the person and estimate the person type based on the hair color. For example, the estimation unit 13 estimates that the person is an aged person when the person has white hair.

The estimation unit 13 may estimate the person type based on an object associated with the person. The object is, for example, an object that the person wears, has, and uses, or a movement aid.

The estimation unit 13 estimates that the person is a child, for example, when the person is carrying a bookbag on the back. The estimation unit 13 estimates that the person is a person with walking difficulty when the person is using a movement aid or a wheelchair. The movement aid is a walking aid such as a walking stick, a walker, or a walking vehicle.

The estimation unit 13 may estimate the person type by detecting motion of the person. For example, the estimation unit 13 detects the moving speed of the person by using a plurality of images captured at different timings and estimates the person type based on the moving speed. For example, the estimation unit 13 detects the walking speed of the person when the person is a pedestrian. The estimation unit 13 estimates that the person is an aged person when the walking speed is lower than a predetermined speed. The estimation unit 13 may perform the estimation through comparison with the walking speed of a nearby person. The estimation unit 13 may perform the estimation based on the above-described posture or hair color as well.

The estimation unit 13 estimates that the person is a general pedestrian when no characteristic as described above is detected. In this example, the general pedestrian is a person corresponding to none of a child, an aged person, and a person with walking difficulty.

The estimation unit 13 may determine whether a dangerous scene is included in the captured image, and estimate a result of the determination as the attribute. Specifically, the estimation unit 13 may estimate, as the attribute, the existence of a dangerous scene in the image. The estimation unit 13 may estimate the likelihood of an accident in accordance with the contents of the dangerous scene. For example, the estimation unit 13 may specify the likelihood of an accident as a danger level. The danger level may be quantified or may be classified into a plurality of levels.

A dangerous scene will be specifically described with reference to the examples illustrated in FIG. 5. For example, consider a case in which it is estimated that the person type is a child. The estimation unit 13 estimates that a dangerous scene is included in the image when the person is playing with a ball, riding a skateboard, or riding a bicycle.

For example, consider a case in which an adult and a child thought to be a family or the like are detected in the captured image. The estimation unit 13 estimates that a dangerous scene is included in the image when the child is not holding hands with the parent. The estimation unit 13 estimates that a dangerous scene is included in the image also when a plurality of children fooling around are detected.

Consider a case in which it is estimated that the person type is a general pedestrian. The estimation unit 13 estimates that a dangerous scene is included in the image when the person is operating a portable terminal such as a smartphone or making a call while walking or when a plurality of persons are walking while having a conversation.

The estimation unit 13 may further estimate an environment indicating the environment surrounding the person, determine whether a dangerous scene is included based on the estimated environment, and estimate the attribute in accordance with a result of the determination. The environment may be, for example, the existence of a crosswalk, the existence of a step, the existence of an intersection, change of the color of a traffic light, or information indicating weather such as rain or snow.

For example, consider a case in which it is estimated that the person type is an aged person. The estimation unit 13 estimates that a dangerous scene is included in the image when a scene is detected in which, for example, the person is crossing a road without a crosswalk or a traffic light is changing to red.

Consider a case in which it is estimated that the person type is a person with walking difficulty. The estimation unit 13 estimates that a dangerous scene is included in the image when a step or the like exists in the surroundings of the person. The estimation unit 13 estimates that a dangerous scene is included in the image also when it is estimated that the person type is a general pedestrian and a crosswalk exists nearby.

The examples of the attribute are described above with reference to FIG. 5. The estimation unit 13 may estimate any other information as the attribute. The estimation unit 13 may estimate, as the attribute, any one piece of information or two or more pieces of information among the examples. The estimation unit 13 may estimate the attribute by combining a plurality of pieces of information. For example, the estimation unit 13 estimates the person type based on the height and face recognition of the detected person. Accordingly, the person type can be more accurately estimated than in a case in which the estimation is performed based only on the height.

Consider a case in which a plurality of persons are included in the captured image and detected to be positioned near one another in the image. In this case, the estimation unit 13 estimates the attribute of at least one of the plurality of persons based on the captured image.

For example, the estimation unit 13 may estimate, as the attribute, at least one of the age and motion of any of the plurality of persons. The estimation unit 13 estimates, as the attribute, information that, for example, the plurality of persons are all children, having a conversation, or fooling around.

Description continues with reference to FIG. 4 again. The determination unit 14 is an example of the above-described determination unit 104. The determination unit 14 determines the timing of certain vehicle control based on the positional relation and the attribute. In the following description, the timing of the certain vehicle control is also simply referred to as "control timing".

The certain vehicle control is control performed on the vehicle 2 to lower the probability of accident occurrence. The certain vehicle control may include, for example, at least one of braking intervention to the vehicle 2 and warning to the driver of the vehicle 2. The certain vehicle control may include both the braking intervention and the warning to the driver. It is possible to further lower the probability of accident occurrence by performing both the braking intervention and the warning.

The determination unit 14 determines the control timing so that the timing of vehicle control becomes earlier as the probability of accident occurrence corresponding to the positional relation of the vehicle 2 and the attribute increases.

The determination unit 14 may determine the control timing further based on the speed of the vehicle 2 in addition to the positional relation and the attribute. The determination unit 14 determines the control timing so that the control timing becomes earlier as the speed of the vehicle 2 increases.

The determination unit 14 also determines the control timing so that the control timing becomes earlier as the degree of overlapping between the traveling path of the vehicle 2 and the person increases.

The determination unit 14 may determine the timing based on timing information defined in advance. The timing information is information by which at least one of the positional relation and the vehicle speed is associated with the control timing in advance. The timing information may be held in the drive support apparatus 10 by using a certain data table.

The timing information may include a plurality of timing tables defined in accordance with the attribute. The determination unit 14 selects a timing table in accordance with the attribute of the person from among the plurality of timing tables and determines the control timing.

The timing information will be described below with reference to FIG. 6. FIG. 6 is a diagram illustrating an image of a timing table 191 that is an example of the timing information. The timing table 191 may be stored in advance and held in the storage unit 19.

In the timing table 191, a relative distance threshold Th as the control timing is defined in accordance with the overlapping rate L and a relative speed V. The relative distance threshold Th is a threshold set to determine whether to perform vehicle control. For example, in a case in which the relative distance threshold Th is 3 m, the drive support apparatus 10 performs vehicle control such as braking intervention or warning to the driver when the relative distance between the vehicle 2 and the person has become equal to or shorter than 3 m.

The overlapping rate L is information indicating the degree of overlapping between the traveling path of the vehicle 2 and the person and can be calculated by using Calculation Expression (1) described above. The relative speed V is the relative speed between the vehicle 2 and the person. The determination unit 14 acquires the overlapping rate L and the relative speed V from the calculation unit 12, refers to the timing table 191, and acquires the relative distance threshold Th associated with the overlapping rate L and the relative speed V. The determination unit 14 determines the relative distance threshold Th as the control timing.

For example, consider a case in which the overlapping rate L is zero and the relative speed V is 10 km/h in the example illustrated in FIG. 6. In this case, the relative distance threshold Th is 3 m. Thus, the determination unit 14 determines, as the control timing, a "timing at which the relative distance between the vehicle 2 and the person becomes equal to or shorter than 3 m".

As illustrated in the drawing, the timing table 191 is defined such that the relative distance threshold Th increases as the overlapping rate L increases. Accordingly, the determination unit 14 can determine the control timing so that vehicle control is performed earlier as the degree of overlapping between the traveling path of the vehicle 2 and the person increases.

Similarly, the timing table 191 is defined so that the relative distance threshold Th increases as the relative speed V increases. Accordingly, the determination unit 14 can determine the control timing so that vehicle control is performed earlier as the relative speed V increases.

The determination unit 14 acquires the overlapping rate L and the relative speed V as needed and determines the control timing. In this manner, the determination unit 14 can determine an appropriate timing in accordance with change of the overlapping rate L and the relative speed V between the vehicle 2 and the person. The values written in the image of the timing table 191 illustrated in FIG. 6 are exemplary and thus may be changed as appropriate. The timing table 191 may be defined by tuning each of the overlapping rate L, the relative speed V, and the relative distance threshold Th illustrated in the drawing as appropriate.

The timing table 191 may be defined in accordance with the attribute. Specifically, the timing table 191 may be defined with different control timings in accordance with a plurality of examples of the attribute, respectively.

FIG. 7 is a diagram illustrating an example of the correspondence relation between the attribute and the timing table 191. The drawing illustrates the correspondence relation between the person type as an example of the attribute and each of a plurality of timing tables 191-1 to 191-10. The drawing illustrates the five examples of the person type, namely a child, an aged person, a person with walking difficulty, a general pedestrian (with a dangerous scene), and a general pedestrian (without a dangerous scene).

Each example of the person type is associated with two examples of the vehicle control, namely braking intervention and warning to the driver. Accordingly, the timing tables 191-1 to 191-10 in a total of 10 patterns are defined as combinations of the attribute and the vehicle control.

The determination unit 14 selects one of the plurality of timing tables 191-1 to 191-10 in accordance with the attribute of a person detected in the image and determines the control timing. In other words, the determination unit 14 switches the plurality of timing tables 191-1 to 191-10 in accordance with the attribute of the person and determines the control timing.

The timing tables 191-1 to 191-10 are each defined by tuning the above-described relative distance threshold Th. Accordingly, the determination unit 14 can define the relative distance threshold Th in accordance with the attribute.

Since the relative distance threshold Th can be differently defined for each of the braking intervention and the warning, the determination unit 14 can more flexibly determine the control timing. For example, it is possible to further lower the probability of accident occurrence by defining the timing tables 191-1 to 191-10 such that the warning is performed at a timing earlier than the braking intervention.

The timing tables 191-1 to 191-10 may be defined for respective examples of the attribute as illustrated in FIG. 7 or may be defined for each group of a plurality of examples of the attribute.

When a plurality of persons are detected in the captured image, the determination unit 14 determines the control timing based on the positional relation and attribute of at least one of the plurality of persons. For example, consider a case an adult and a child thought to be a family or the like are detected in the image. The determination unit 14 may compare the attribute of the parent and the attribute of the child and determine the control timing based on the positional relation and attribute of the child, to which an accident is more likely to occur.

Description continues with reference to FIG. 4 again. The vehicle control unit 15 performs the certain vehicle control on the vehicle 2 in accordance with the control timing determined by the determination unit 14. For example, the vehicle control unit 15 is connected to a non-illustrated vehicle control electronic control unit (ECU) provided in the vehicle 2. The vehicle control ECU is a control apparatus configured to control the vehicle 2.

The vehicle control unit 15 and the vehicle control ECU may be connected to each other by using, for example, a controller area network (CAN) communication line or a wireless communication network. The vehicle control unit 15 instructs the vehicle control ECU in accordance with the determined control timing. Accordingly, the vehicle control ECU controls the vehicle 2. The vehicle control ECU may include, for example, a power unit control ECU and a braking ECU that perform acceleration-deceleration control of the vehicle 2. For example, the braking ECU controls braking in accordance with the determined control timing.

The vehicle control unit 15 warns the driver in accordance with the determined control timing. The warning to the driver may visually or acoustically output information. For example, the vehicle control unit 15 includes a display apparatus such as a display configured to display a warning message or a voice output apparatus such as a speaker configured to output a warning message by voice. The vehicle control unit 15 may control the display apparatus or voice output apparatus provided in the vehicle 2 in advance. The vehicle control unit 15 warns the driver by displaying or voice-outputting a message such as "A child found at 10 m on the front side. Pay attention.". The above description is an example of the warning, and thus the vehicle control unit may perform the warning by any other method.

The storage unit 19 stores the above-described timing table 191. The timing table 191 may include the plurality of timing tables 191-1 to 191-10. The number of timing tables 191 is not limited to 10. The storage unit 19 may store a computer program that implements processing of the drive support method according to the present example embodiment.

Although each configuration of the drive support system 1 is described above, the above-described configuration is merely exemplary and may be changed as appropriate. For example, the drive support system 1 is not limited to the exemplary configurations illustrated in FIGS. 3 and 4. The drive support system 1 may be configured by using, for example, an apparatus in which a plurality of configurations are collectively provided. For example, functions of the camera 5 and the drive support apparatus 10 may be collectively provided at a single apparatus.

Processing at the functional components of the drive support apparatus 10 may be performed in a distributed manner by using a plurality of apparatuses or the like. For example, some functions of the detection unit 11, the calculation unit 12, the estimation unit 13, the determination unit 14, the vehicle control unit 15, and the storage unit 19 may be realized by using another apparatus. For example, the other apparatus may have functions of the detection unit 11, detect a person in an image, and output a result of the detection to the drive support apparatus 10.

Processing executed by each above-described functional component may be realized by using a model subjected to machine learning. For example, the determination unit 14 may determine the control timing by using a learning-completed model generated by using AI or the like into which a neural network is introduced. The learning-completed model may be a model subjected to learning in advance to receive inputting of the positional relation and the attribute and output the control timing. The determination unit 14 acquires the control timing from the learning-completed model by inputting the positional relation and the attribute to the learning-completed model. Accordingly, the determination unit 14 can determine the control timing by using the learning-completed model in place of the timing table 191.

Figure 8:
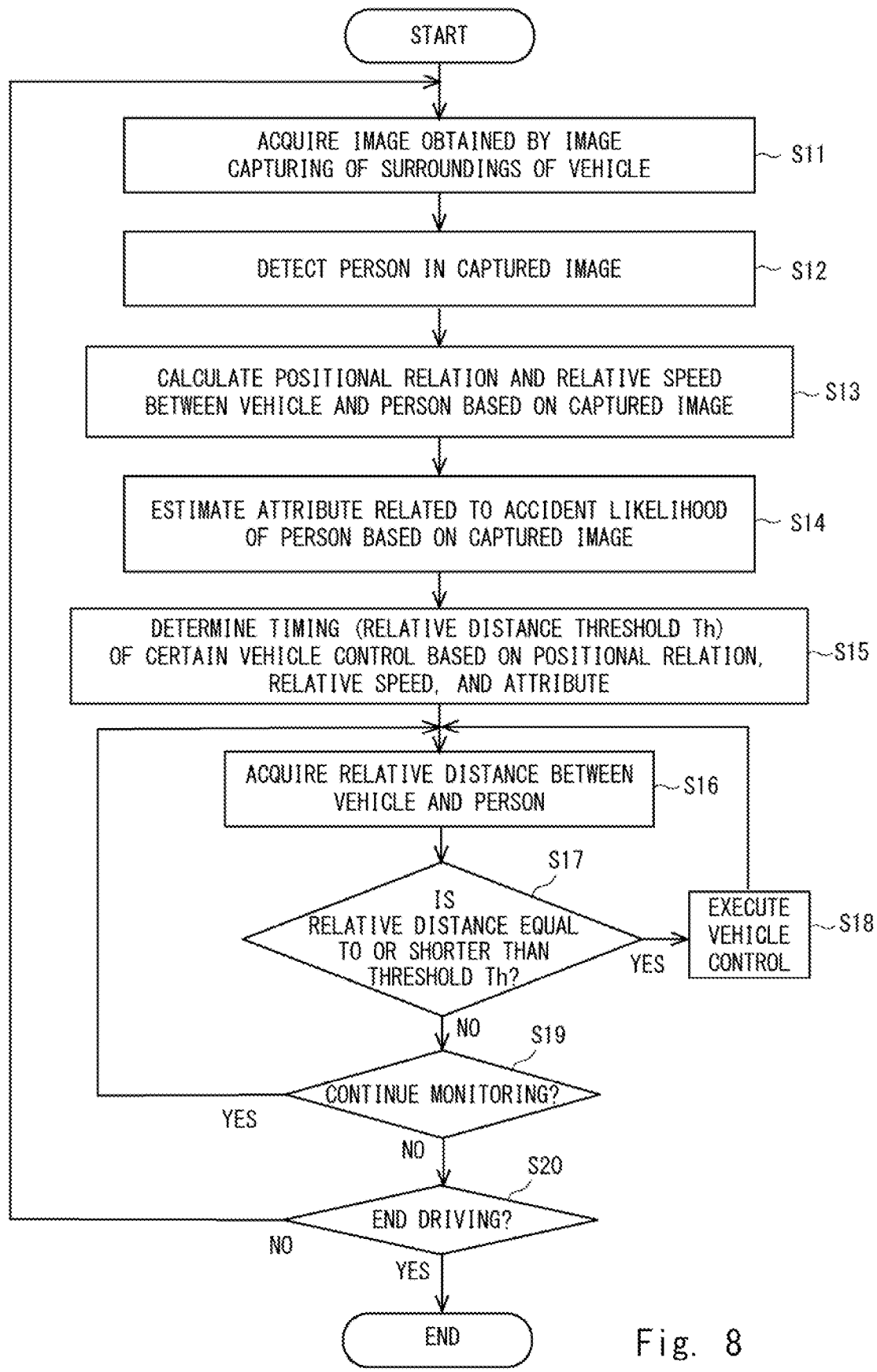
FIG. 8 is a flowchart illustrating processing performed by the drive support apparatus according to the second example embodiment.

Processing performed by the drive support apparatus 10 will be described next with reference to FIG. 8. FIG. 8 is a flowchart illustrating the processing performed by the drive support apparatus 10.

First, the detection unit 11 acquires, from the camera 5, an image obtained by image capturing of the surroundings of the vehicle (S11). Subsequently, the detection unit 11 detects a person in the captured image (S12). The detection unit 11 may detect a plurality of persons in the captured image.

Subsequently, the calculation unit 12 calculates the positional relation and relative speed between the vehicle 2 and the person based on the captured image (S13). The positional relation may include information of the distance between the vehicle 2 and the person. The positional relation may include information of the direction in which the person is positioned with respect to the vehicle 2. The positional relation may include the overlapping rate L indicating the degree of overlapping between the traveling path of the vehicle 2 and the person.

Subsequently, the estimation unit 13 estimates the attribute of the person based on the captured image, the attribute being related to the likelihood of an accident (S14). The attribute may include a characteristic of the person or information estimated based on the characteristic, the characteristic including at least any one of appearance of the person, motion of the person, an object associated with the person, and the environment surrounding the person.

The attribute is information that, for example, the person has a height lower than that of any nearby person, carries a bookbag on the back, has white hair, or sits on a wheelchair, like the examples illustrated in FIG. 5. The attribute may be an age or sex estimated by using a technology such as face recognition. The attribute may be information that, for example, the person is playing with a ball or walking while operating a smartphone or the like.

When a plurality of persons positioned near one another are detected in the captured image, the estimation unit 13 estimates the attribute of at least one of the plurality of persons based on the captured image. Thus, the attribute may be information that, for example, a child is not holding hands with a parent or the plurality of persons are walking while having a conversation.

Subsequently, the determination unit 14 determines the timing of the certain vehicle control based on the positional relation, the relative speed, and the attribute (S15). The determination unit 14 determines the control timing so that the timing of the vehicle control becomes earlier as the probability of accident occurrence corresponding to the positional relation of the vehicle 2, the relative speed, and the attribute increases.

The determination unit 14 may refer to the timing table 191 illustrated in FIG. 6 when determining the control timing. The timing table 191 is information by which the overlapping rate L as the positional relation, the relative speed V between the vehicle 2 and the person, and the relative distance threshold Th as the control timing are associated with one another in advance. The timing table 191 is defined with the relative distance threshold Th so that the control timing becomes earlier as at least one of the overlapping rate L and the relative speed V increases.

The determination unit 14 may select a timing table in accordance with the attribute of the person from among the plurality of timing tables 191-1 to 191-10 illustrated in FIG. 7 and determine the control timing. Accordingly, the determination unit 14 determines the relative distance threshold Th in accordance with the attribute of the person.

Subsequently, the vehicle control unit 15 acquires the relative distance between the vehicle 2 and the person (S16). The vehicle control unit 15 determines whether the relative distance is equal to or shorter than the relative distance threshold Th (S17).

When the relative distance is longer than the relative distance threshold Th (NO at S17), the vehicle control unit 15 advances processing to step S19. When the relative distance is equal to or shorter than the relative distance threshold Th (YES at S17), the vehicle control unit 15 executes vehicle control (S18). The vehicle control is braking intervention or warning to the driver. Alternatively, the vehicle control may be both the braking intervention and the warning. The vehicle control unit 15 executes the vehicle control by, for example, instructing the non-illustrated vehicle control ECU. After having executed the vehicle control, the vehicle control unit 15 returns to step S16 and repeats processing. Accordingly, the vehicle control unit 15 monitors the relative distance between the vehicle 2 and the detected person.

When the relative distance is longer than the relative distance threshold Th (NO at S17), the vehicle control unit 15 determines whether to continue monitoring the relative distance (S19). The vehicle control unit 15 returns to the processing at step S16 when the monitoring is to be continued (YES at S19), or advances processing to step S20 when the monitoring is not to be continued (NO at S19). The vehicle control unit 15 may determine whether to continue the monitoring in accordance with the positional relation between the vehicle 2 and the person. For example, when the monitoring is no longer needed because the braking intervention is executed at step S18, the vehicle control unit 15 may determine that the monitoring is not to be continued.

Then, the vehicle control unit 15 determines whether the driver ends driving the vehicle 2 (S20). The vehicle control unit 15 ends the present processing when the driving is to be ended (YES at S20), or returns to the processing at step S11 and repeats the following processing when the driving is not to be ended (NO at S20).

As described above, in the drive support system 1 according to in the present example embodiment, the camera 5 provided at the vehicle 2 captures an image of the surroundings of the vehicle and outputs the captured image to the drive support apparatus 10. The drive support apparatus 10 determines the timing of vehicle control by executing certain processing based on the captured image. The drive support apparatus 10 detects a person in the captured image, calculates the positional relation between the vehicle and the person, and estimates the attribute of the person, the attribute being related to the likelihood of an accident. The drive support apparatus 10 determines the timing of certain vehicle control based on the positional relation and the attribute.

In this manner, the drive support apparatus 10 according to the present example embodiment can change the timings of automatic braking intervention and warning in accordance with the attribute of a pedestrian by using, for example, combination of pedestrian recognition, pedestrian distance estimation, and pedestrian height estimation by camera recognition, and pedestrian characteristic recognition by AI. The drive support apparatus 10 can recognize characteristics of a pedestrian and thus can identify, for example, a child, an aged person, a person with walking difficulty, or a general pedestrian and perform drive support in accordance with each type of pedestrian.

Thus, the drive support apparatus 10 can perform, at a timing earlier than that for a general pedestrian, vehicle control for a child who is difficult to see from the driver and highly likely to jump in or an aged person having difficulty in noticing a surrounding traffic situation. Moreover, in a case of a general pedestrian as well, the drive support apparatus 10 can perform vehicle control at an early timing when a dangerous scene in which, for example, the pedestrian is having a conversation or operating a smartphone is detected.

Accordingly, the drive support system 1 according to the present example embodiment can perform vehicle control at an appropriate timing in accordance with the attribute of a person existing in the surroundings of the vehicle and reduce danger that would occur to the vehicle and the person in the surroundings.

<Exemplary Hardware Configuration>

Each functional component of the drive support apparatus 10 may be realized by a hardware component (for example, a hardwired electronic circuitry) that realizes the functional component or may be realized by combination of hardware and software components (for example, combination of an electronic circuitry and a computer program that controls the electronic circuitry). The following description will be made on a case in which each functional component of the drive support apparatus 10 is realized by combination of hardware and software components.

Figure 9:
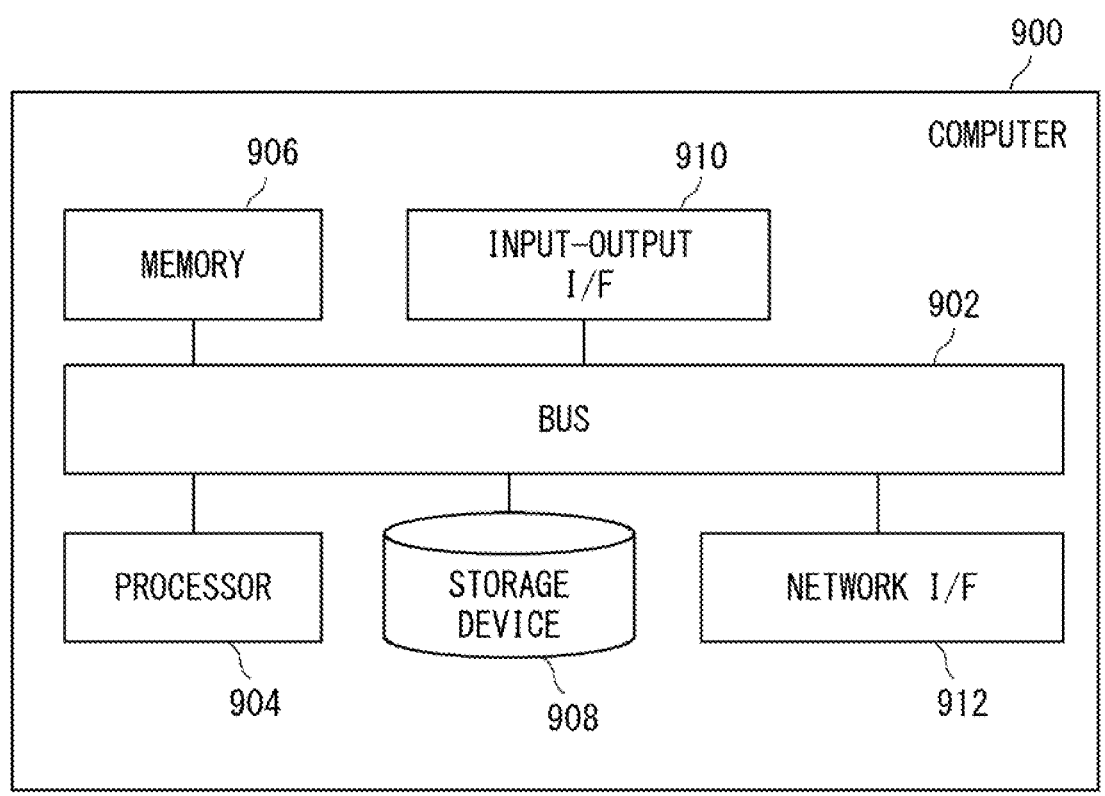
FIG. 9 is a block diagram exemplarily illustrating a hardware configuration of a computer that realizes the drive support apparatus according to the second example embodiment.

FIG. 9 is a block diagram exemplarily illustrating a hardware configuration of a computer 900 that realizes the drive support apparatus 10. The computer 900 may be a dedicated computer that is designed to realize the drive support apparatus 10 or may be a general-purpose computer. The computer 900 may be a portable computer such as a smartphone or a tablet terminal.

For example, each function of the drive support apparatus 10 is realized at the computer 900 by installing a certain application on the computer 900. The above-described application is configured as a computer program for realizing a functional component of the drive support apparatus 10.

The computer 900 includes a bus 902, a processor 904, a memory 906, a storage device 908, an input-output interface 910, and a network interface 912. The bus 902 is a data transmission path through which the processor 904, the memory 906, the storage device 908, the input-output interface 910, and the network interface 912 mutually transmit and receive data. However, a method of connecting the processor 904 and the other components to one another is not limited to bus connection.

The processor 904 is various kinds of processors such as a central processing unit (CPU), a graphics processing unit (GPU), and a field-programmable gate array (FPGA). The memory 906 is a main storage apparatus realized by using a random access memory (RAM) or the like. The storage device 908 is an auxiliary storage apparatus realized by using a hard disk, a solid state drive (SSD), a memory card, a read only memory (ROM), or the like.

The input-output interface 910 is an interface for connecting the computer 900 to an input-output device. For example, the input-output interface 910 is connected to an input apparatus such as a keyboard and to an output apparatus such as a display apparatus.

The network interface 912 is an interface for connecting the computer 900 to a network. The network may be a local area network (LAN) or a wide area network (WAN).

The storage device 908 stores a computer program that realizes each functional component of the drive support apparatus 10 (computer program that realizes the above-described application). The processor 904 realizes each functional component of the drive support apparatus 10 by loading the computer program onto the memory 906 and executing the computer program.

Each processor executes one or more computer programs including instructions for causing a computer to execute an algorithm described with reference to the accompanying drawings. Each computer program includes instructions (or software codes) for causing a computer to achieve one or more functions described in the example embodiments when the computer program is loaded onto the computer. The computer program may be stored in various types of non-transitory computer readable media or tangible storage media. Non-limiting examples of the non-transitory computer readable media or the tangible storage media include a random-access memory (RAM), a read-only memory (ROM), a flash memory, a solid-state drive (SSD), any other memory technology, a CD-ROM, a digital versatile disc (DVD), a Blu-ray (registered trademark) disk, any other optical disk storage, a magnetic cassette, a magnetic tape, a magnetic disk storage, and any other magnetic storage device. The computer program may be transmitted on various types of transitory computer readable media or communication media. Non-limiting examples of the transitory computer readable media or the communication media include electric, optical, and acoustic propagation signals, and propagation signals in any other format.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The first and second embodiments can be combined as desirable by one of ordinary skill in the art.

With a drive support apparatus, a drive support method, and a computer program according to the present disclosure, it is possible to perform vehicle control at an appropriate timing in accordance with an attribute of a person existing in the surroundings of a vehicle.

Part or all of the above-described example embodiments can be written as supplementary notes below but are not limited by them.

Supplementary Note 1

A drive support apparatus including:
a detection unit configured to detect a person in an image obtained by image capturing of the surroundings of a vehicle;
a calculation unit configured to calculate a positional relation between the vehicle and the person based on the image;
an estimation unit configured to estimate an attribute of the person, the attribute being related to the likelihood of an accident based on the image; and
a determination unit configured to determine a timing of certain vehicle control based on the positional relation and the attribute.

Supplementary Note 2

The drive support apparatus according to Supplementary Note 1, in which the attribute includes a characteristic of the person or information estimated based on the characteristic, the characteristic including at least any one of appearance of the person, motion of the person, an object associated with the person, and an environment surrounding the person.

Supplementary Note 3

The drive support apparatus according to Supplementary Note 1 or 2, in which
the positional relation includes overlap information indicating a degree of overlapping between a traveling path of the vehicle and the person, and
the determination unit determines the timing such that the timing becomes earlier as the degree of overlapping increases.

Supplementary Note 4

The drive support apparatus according to any one of Supplementary Note 1 to 3, in which the determination unit determines the timing further based on speed of the vehicle.

Supplementary Note 5

The drive support apparatus according to any one of Supplementary Note 1 to 4, in which the determination unit determines the timing based on timing information by which the timing is associated with at least one of the positional relation and speed of the vehicle in advance.

Supplementary Note 6

The drive support apparatus according to Supplementary Note 5, in which
the timing information includes a plurality of timing tables defined in accordance with the attribute, and
the determination unit selects a timing table in accordance with the attribute of the person from among the timing tables and determines the timing.

Supplementary Note 7

The drive support apparatus according to any one of Supplementary Note 1 to 6, in which
when a plurality of persons positioned near one another are detected in the image, the estimation unit estimates an attribute of at least one of the plurality of persons based on the image, and The determination unit determines the timing based on the positional relation and the attribute of at least one of the plurality of persons.

Supplementary Note 8

The drive support apparatus according to any one of Supplementary Note 1 to 7, in which the certain vehicle control includes at least one of braking intervention and warning to a driver.

Supplementary Note 9

A drive support system including:
a camera configured to capture an image of surroundings of a vehicle; and
a drive support apparatus, in which
the drive support apparatus includes
   a detection unit configured to acquire an image from the camera and detect a person in the image,
   a calculation unit configured to calculate a positional relation between the vehicle and the person based on the image,
   an estimation unit configured to estimate an attribute of the person, the attribute being related to the likelihood of an accident based on the image, and
   a determination unit configured to determine a timing of certain vehicle control based on the positional relation and the attribute.

Supplementary Note 10

The drive support system according to Supplementary Note 9, in which the attribute includes a characteristic of the person or information estimated based on the characteristic, the characteristic including at least any one of appearance of the person, motion of the person, an object associated with the person, and an environment surrounding the person.

Supplementary Note 11

A drive support method by which a computer executes:
a detection step of detecting a person in an image obtained by image capturing of the surroundings of a vehicle;
a calculation step of calculating a positional relation between the vehicle and the person based on the image;
an estimation step of estimating an attribute of the person, the attribute being related to the likelihood of an accident based on the image; and
a determination step of determining a timing of certain vehicle control based on the positional relation and the attribute.

Supplementary Note 12

The drive support method according to Supplementary Note 11, in which the attribute includes a characteristic of the person or information estimated based on the characteristic, the characteristic including at least any one of appearance of the person, motion of the person, an object associated with the person, and an environment surrounding the person.

Supplementary Note 13

A computer program configured to cause a computer to execute:
a detection step of detecting a person in an image obtained by image capturing of the surroundings of a vehicle;
a calculation step of calculating a positional relation between the vehicle and the person based on the image;
an estimation step of estimating an attribute of the person, the attribute being related to the likelihood of an accident based on the image; and
a determination step of determining a timing of certain vehicle control based on the positional relation and the attribute.

Supplementary Note 14

The computer program according to Supplementary Note 13, in which the attribute includes a characteristic of the person or information estimated based on the characteristic, the characteristic including at least any one of appearance of the person, motion of the person, an object associated with the person, and an environment surrounding the person.

What is claimed is:

1. A drive support apparatus comprising:
at least one memory storing instructions, and
at least one processor configured to execute the instruction to:
detect a person in an image of surroundings of a vehicle,
calculate a positional relation between the vehicle and the person based on at least one of the image and information acquired by a sensor configured to measure distance to an object in the surroundings of the vehicle,
estimate an attribute of the person based on the image, the attribute being related to likelihood of an accident, and
determine a timing of a vehicle control based on the positional relation and the attribute,
wherein the at least one processor is further configured to execute the instructions to determine the timing based on timing information associating the timing with at least one of the positional relation and speed of the vehicle in advance,
wherein the timing information includes a plurality of timing tables defined in accordance with the attribute, and
the at least one processor is further configured to execute the instructions to select a timing table from among the timing tables in accordance with the attribute of the person, and determine the timing based on the selected timing table.

2. The drive support apparatus according to claim 1, wherein the attribute includes a characteristic of the person or information estimated based on the characteristic, the characteristic including at least any one of appearance of the person, motion of the person, an object associated with the person, and an environment surrounding the person.

3. The drive support apparatus according to claim 1, wherein
the positional relation includes overlap information indicating a degree of overlapping between a traveling path of the vehicle and the person, and
the at least one processor is further configured to execute the instructions to determine the timing such that the timing becomes earlier as the degree of overlapping increases.

4. The drive support apparatus according to claim 1, wherein the at least one processor is further configured to execute the instructions to determine the timing further based on speed of the vehicle.

5. The drive support apparatus according to claim 1, wherein the at least one processor is further configured to execute the instructions to:
   in a case that a plurality of persons moving together at a certain distance are detected in the image, estimate an attribute of at least one of the plurality of persons based on the image, and
   determine the timing based on the positional relation and the attribute of at least one of the plurality of persons.

6. The drive support apparatus according to claim 1, wherein the vehicle control includes at least one of braking intervention and warning to a driver.

7. A drive support method comprising:
   detecting a person in an image of surroundings of a vehicle;
   calculating a positional relation between the vehicle and the person based on at least one of the image and information acquired by a sensor configured to measure distance to an object in the surroundings of the vehicle;
   estimating an attribute of the person based on the image, the attribute being related to likelihood of an accident; and
   determining a timing of a vehicle control based on the positional relation and the attribute,
   wherein the determining includes determining the timing based on timing information associating the timing with at least one of the positional relation and speed of the vehicle in advance,
   wherein the timing information includes a plurality of timing tables defined in accordance with the attribute, and
   wherein the determining includes selecting a timing table from among the timing tables in accordance with the attribute of the person, and determining the timing based on the selected timing table.

8. The drive support method according to claim 7, wherein the attribute includes a characteristic of the person or information estimated based on the characteristic, the characteristic including at least any one of appearance of the person, motion of the person, an object associated with the person, and an environment surrounding the person.

9. A non-transitory computer readable medium storing a computer program configured to cause a computer to execute a drive support method comprising:
   detecting a person in an image of surroundings of a vehicle;
   calculating a positional relation between the vehicle and the person based on at least one of the image and information acquired by a sensor configured to measure distance to an object in the surroundings of the vehicle;
   estimating an attribute of the person based on the image, the attribute being related to likelihood of an accident; and
   determining a timing of a vehicle control based on the positional relation and the attribute,
   wherein the determining includes determining the timing based on timing information associating the timing with at least one of the positional relation and speed of the vehicle in advance,
   wherein the timing information includes a plurality of timing tables defined in accordance with the attribute, and
   wherein the determining includes selecting a timing table from among the timing tables in accordance with the attribute of the person, and determining the timing based on the selected timing table.

10. The non-transitory computer readable medium according to claim 9, wherein the attribute includes a characteristic of the person or information estimated based on the characteristic, the characteristic including at least any one of appearance of the person, motion of the person, an object associated with the person, and an environment surrounding the person.

* * * * *